(12) United States Patent
Abe et al.

(10) Patent No.: US 9,232,428 B2
(45) Date of Patent: Jan. 5, 2016

(54) APERIODIC CHANNEL STATE INFORMATION REPORTING METHOD, RADIO BASE STATION APPARATUS AND USER TERMINAL

(75) Inventors: Tetsushi Abe, Tokyo (JP); Kazuaki Takeda, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 179 days.

(21) Appl. No.: 13/985,786

(22) PCT Filed: Feb. 13, 2012

(86) PCT No.: PCT/JP2012/053294
§ 371 (c)(1),
(2), (4) Date: Sep. 13, 2013

(87) PCT Pub. No.: WO2012/111625
PCT Pub. Date: Aug. 23, 2012

(65) Prior Publication Data
US 2014/0023009 A1  Jan. 23, 2014

(30) Foreign Application Priority Data
Feb. 18, 2011 (JP) ................................. 2011-033685

(51) Int. Cl.
*H04W 24/10* (2009.01)
*H04W 84/04* (2009.01)
*H04W 88/08* (2009.01)

(52) U.S. Cl.
CPC ............ *H04W 24/10* (2013.01); *H04W 84/045* (2013.01); *H04W 88/08* (2013.01)

(58) Field of Classification Search
None
See application file for complete search history.

(56) References Cited

U.S. PATENT DOCUMENTS

2009/0190528 A1* 7/2009 Chung et al. .................. 370/328
2011/0249578 A1* 10/2011 Nayeb Nazar et al. ....... 370/252
2013/0242924 A1* 9/2013 Kim et al. ...................... 370/329

OTHER PUBLICATIONS

International Search Report issued in PCT/JP2012/053294 mailed on May 1, 2012 (3 pages).

(Continued)

*Primary Examiner* — Marcus R Smith
*Assistant Examiner* — Lakeram Jangbahadur
(74) *Attorney, Agent, or Firm* — Osha Liang LLP

(57) ABSTRACT

In order to report aperiodic channel state information (A-CSI) flexibly even when a user terminal performs radio communication using a plurality of component carriers (CCs) in an HetNet environment, the present invention provides an aperiodic channel sate information reporting method comprising: a step of transmitting in advance, from a pico base station (PeNB) to pico UE, channel state measurement target information having information about presence or absence of reporting of channel state information and a subframe as a measurement target associated with trigger bit information indicating information about presence or absence of reporting of channel state information and a component carrier as a measurement target (step ST401); and a step of reporting channel state information of the subframe and the component carrier designated by the trigger bit information transmitted on a PDCCH, to the pico base station (PeNB) on a PUSCH (step ST406).

10 Claims, 8 Drawing Sheets

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)", Sep. 2006 (57 pages).

3GPP TS 36.212 V9.3.0; "3rd Generation Partnership Project; Technical Specification Group Radio Access Network; Evolved Universal Terrestrial Radio Access (E-UTRA); Multiplexing and channel coding (Release 9)"; Sep. 2010 (61 pages).

* cited by examiner

| TRIGGER BIT | CC INFORMATION | SF INFORMATION |
|---|---|---|
| 00 | NO TRIGGERING | NO TRIGGERING |
| 01 | DLCC LINKED TO ULCC | BITMAP 1 |
| 10 | ALL CCS | BITMAP 2 |
| 11 | ALL CCS | BITMAP 1 |

FIG. 9A

| TRIGGER BIT | CC INFORMATION | SF INFORMATION |
|---|---|---|
| 00 | NO TRIGGERING | NO TRIGGERING |
| 01 | PCC | BITMAP 1 |
| 10 | ALL CCS | BITMAP 2 |
| 11 | ALL CCS | BITMAP 1, 2 |

FIG. 9B

APERIODIC CHANNEL STATE INFORMATION REPORTING METHOD, RADIO BASE STATION APPARATUS AND USER TERMINAL

TECHNICAL FIELD

The present invention relates to an aperiodic channel state information reporting method, a radio base station apparatus and a user terminal in a next-generation radio communication system.

BACKGROUND ART

In the UMTS (Universal Mobile Telecommunications System) Network, LTE (Long Term Evolution) has been under study for the purpose of further increasing data rate, achieving low delay and the like (for example, see Non Patent Literature 1). In LTE, as multi-access schemes, OFDMA (Orthogonal Frequency Division Multiple Access) based scheme is used for the downlink and SC-FDMA (Single Carrier Frequency Division Multiple Access)-based scheme is used for the uplink.

In the LTE system, uplink signals are mapped to appropriate radio resources and transmitted from a user terminal to a radio base station apparatus. Specifically, uplink user data is transmitted using a PUSCH (Physical Uplink Sheared CHannel). And, uplink control information (UCI) is transmitted using the PUSCH when it is transmitted together with the uplink user data, or is transmitted using a PUCCH (Physical Uplink Control CHannel) when it is transmitted alone.

Uplink control information (UCI) includes transmission acknowledgement (ACK/NACK) for a PDSCH (Physical Downlink Shared CHannel), scheduling request, CSI (Channel State Information) and so on (for example, see Non Patent Literature 2). The channel state information (hereinafter referred to as "CSI") is information based on an instantaneous channel state of the downlink, which includes, for example, channel quality information (CQI), precoding matrix indicator (PMI), rank indicator (RI) and so on. This CSI is reported periodically or aperiodically from a user terminal to a radio base station apparatus.

Aperiodic CSI is transmitted from the user terminal to the radio base station apparatus in accordance with a trigger from the radio base station apparatus. This triggering (aperiodic CSI triggering) is included in an uplink scheduling grant (hereinafter referred to as "UL grant") (DCI format 0/4) transmitted in a PDCCH (Physical Downlink Control CHannel). The user terminal transmits the aperiodic channel state information (hereinafter referred to as "A-CSI") using a PUSCH designated by the UL grant in accordance with the trigger included in the UL grant. Such transmission of A-CSI is also called aperiodic CSI (CQI/PMI/RI) Reporting).

In 3GPP, in order to achieve further broadbandization and higher speeds, there has been studied a succeeding system to LTE (for example, LTE-Advanced). In the LTE-A system, it is preferable to realize a broader band while keeping backward compatibility with the LTE system. In the LTE-A system, it has been studied to aggregate a plurality of fundamental frequency blocks (CCs: component carriers) into a broad band (5 CCs are aggregated into a band of 100 MHz), where each fundamental frequency block is a band available in the LTE system (for example, 20 MHz).

In the LTE-A system, at least one cell is provided for one CC and a user terminal is configured to be able to communicate in plural cells of different CCs. In each CC, one cell where the user terminal performs communication mainly is called a serving cell. In the LTE-A system, the user terminal performs radio communication in plural serving cells of different CCs thereby to realize broadbandization of the system band.

In the LTE-A system, when the user terminal performs radio communication in plural serving cells of different CCs, communication states such as interference levels vary among serving cells. When the aperiodic CSI reporting is performed in the LTE-A system, it is preferable to flexibly report aperiodic channel state information (A-CSI) of a downlink serving cell required for the network among serving cells.

CITATION LIST

Non-Patent Literature

Non-Patent Literature 1: 3GPP, TR25.912 (V7.1.0), "Feasibility study for Evolved UTRA and UTRAN", September 2006

Non-Patent Literature 2: 3GPP, TS36.212 (V.9.3.0), "Multiplexing and channel coding", November 2010

SUMMARY OF THE INVENTION

Technical Problem

There has been studied HetNet (Heterogeneous Network) in which a micro cell (for example, pico cell or femto cell) having a local coverage area of several-ten-meter radius is formed in a macro cell having a wide coverage area of several-kilometer radius.

In the HetNet, for the purpose of improving throughput of the entire system, CRE (Cell Range Expansion) has been under study. In the CRE, a range of the micro cell is expanded by adding an offset to reception power from a radio base station apparatus that forms the micro cell (hereinafter referred to as "micro base station"). Thus, a user terminal positioned in the expanded micro cell (hereinafter referred to as "micro UE") can be handed over from a radio base station apparatus that forms the macro cell (hereinafter referred to as "macro base station") to the micro base station. Use of such CRE is considered to make the user terminal under control of the macro base station (hereinafter referred to as "macro UE") be handed over to the micro cell for offloading, thereby increasing the network capacity.

In HetNet, the user terminal handed over to the micro base station by CRE suffers from large interference from the macro base station. Consequently, there may occur such a situation that the quality of the micro base station cannot be measured appropriately. Accordingly, there has been studied interference coordination to make the macro base station stop data transmission in some subframes thereby to reduce interference that the user terminal suffers from the macro base station.

When the user terminal performs radio communication using a plurality of CCs in such a HetNet environment, if the aperiodic CSI reporting is performed, consideration needs to be given to downlink CCs required for the network side and interference coordination performed in HetNet.

The present invention was carried out in view of the foregoing and aims to provide an aperiodic channel state information reporting method, a radio base station apparatus and a user terminal capable of reporting aperiodic channel state information (A-CSI) flexibly even when the user terminal performs radio communication with a plurality of component carriers (CCs) in a HetNet environment Solution to Problem The present invention provides an aperiodic channel state information reporting method comprising the steps of: transmitting in advance, from a radio base station apparatus to a user terminal, channel state measurement target information having information about presence or absence of reporting of channel state information and a subframe as a measurement target associated with trigger bit information indicating information about presence or absence of reporting of channel state information and a component carrier as a measurement target; and reporting channel state information of the subframe and the component carrier designated by the trigger bit information transmitted on a downlink control channel, to the radio base station apparatus on an uplink shared channel.

According to the aperiodic channel state information reporting method of the present invention, as the channel state measurement target information having the trigger bit information associated with the information about a subframe and information about a component carrier (CC) as measurement target of the channel state information is transmitted in advance to the user terminal, it is possible to specify the CC and subframe as a measurement target of the channel state information at the user terminal only by transmitting the trigger bit information from the radio base station apparatus. Accordingly, even when the user terminal performs radio communication using a plurality of CCs in an HetNet environment, it is possible to identify the subframe and CC required at the network side, thereby allowing flexible reporting of aperiodic channel state information (A-CSI).

Technical Advantage of the Invention

According to the present invention, it is possible to report aperiodic channel state information (A-CSI) flexibly even when a user terminal performs radio communication with use of a plurality of component carriers (CCs) in a HetNet environment.

BRIEF DESCRIPTION OF THE DRAWINGS

FIG. 9 provides diagrams for explaining an example of CSI measurement target information in the aperiodic channel state information reporting method according to the present embodiment.

DESCRIPTION OF EMBODIMENTS

With reference to the accompanying drawings, an embodiment of the present invention will be described in detail below.

In the LTE-A system, when a user terminal performs radio communication with a plurality of serving cells of different component carriers (CCs), the communication states such as interference levels are considered to vary among the serving cells. Accordingly, in the aperiodic channel state information reporting (aperiodic CSI reporting), it is preferable to flexibly report A-CSI of a downlink serving cell required for the network side out of plural serving cells.

Figure 1:
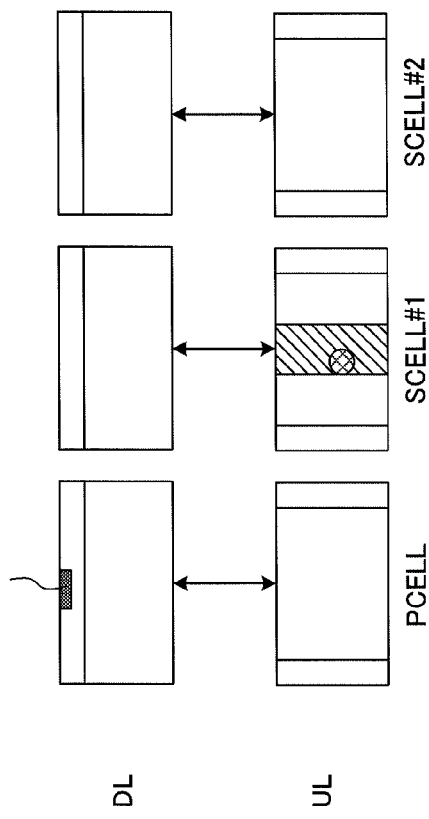
FIG. 1 is a diagram illustrating an example of a method for transmitting A-CSI in the LTE-A system.

FIG. 1 is a diagram illustrating an example of a method for transmitting A-CSI in the LTE-A system. As illustrated in FIG. 1, when one downlink serving cell is designated at the network side, the UL grant (DCI format 0/4) is considered to be added with not only an A-CSI trigger but also bit information to designate a predetermined serving cell (CC). For example, it has been agreed that, in addition to whether or not to report A-CSI, but also which downlink serving cell (downlink CC) to select for A-CSI reporting is specified by adding 1 bit to an existing A-CSI trigger field (1 bit), as illustrated in FIG. 1.

For example, in FIG. 1, when a value (hereinafter also referred to as "trigger bits" as appropriate) of 2-bit A-CSI trigger field (also referred to as "CSI request field") is "00", it is defined that "no A-CSI is transmitted". When the trigger bits are "01", it is defined that "A-CSI is transmitted for a serving cell of a downlink CC corresponding to an uplink CC associated with the UL grant". When the trigger bits are "10", it is defined that "A-CSI is transmitted for at least one serving cell designated as a first set by higher layer signaling". When the trigger bits are "11", it is defined that "A-CSI is transmitted for at least one serving cell designated as a second set by higher layer signaling".

According to FIG. 1, when the trigger bits are "00", A-CSI reporting is not triggered, when the trigger bits are "01", A-CSI reporting is triggered for a downlink CC (hereinafter referred to as "DLCC" as appropriate) linked to an uplink CC (hereinafter referred to as "ULCC" as appropriate) associated with the UL grant. Note that the DLCC linked to the ULCC is based on link information designated by a broadcast signal (more specifically, SIB (System Information Block) 2). And, when the trigger bits are "10", A-CSI reporting is triggered for the first CC set (for example, CC#2, CC#3) reported in advance by higher layer signaling, and when the trigger bits are "11", A-CSI reporting is triggered for the second CC set (for example, CC#4, CC#5) reported in advance by higher layer signaling.

In the above-described example, at least one downlink serving cell (downlink CC) that forms the first or second set is reported in advance by a higher control signal using higher layer signaling (for example RRC signaling). With this reporting, two reporting patterns are realized for the trigger bits "10" and "11".

For example, assuming that a user terminal uses two CCs (CC#0 and CC#1) and CC#0 as the first set and CC#1 as the second set are reported in advance by a higher control signal, when the trigger bits included in the UL grant (format 0/4) are "10", the user terminal reports A-CSI for CC#0 of the first set to the radio base station apparatus. In contrast, when the trigger bits are "11", the user terminal reports A-CSI for CC#1 of the second set to the radio base station apparatus.

Assuming that a user terminal uses two CCs (CC#0 and CC#1) and CC#0 as the first set and CC#0 and CC#1 as the second set are reported in advance by a higher control signal, when the trigger bits included in the UL grant (format 0/4) are "10", the user terminal reports A-CSI for CC#0 of the first set to the radio base station apparatus. In contrast, when the trigger bits are "11", the user terminal reports A-CSI for CC#0 and CC#1 of the second set.

Assuming that a user terminal uses five CCs (CC#0 to CC#4) and CC#0 and CC#1 as the first set and CC#2 to CC#4 as the second set are reported in advance by a higher control signal, when the trigger bits included in the UL grant (format 0/4) are "10", the user terminal reports A-CSI for CC#0 and CC#1 of the first set to the radio base station apparatus. In contrast, when the trigger bits are "11", the user terminal reports A-CSI for CC#2 to CC#4 of the second set.

Figure 2:
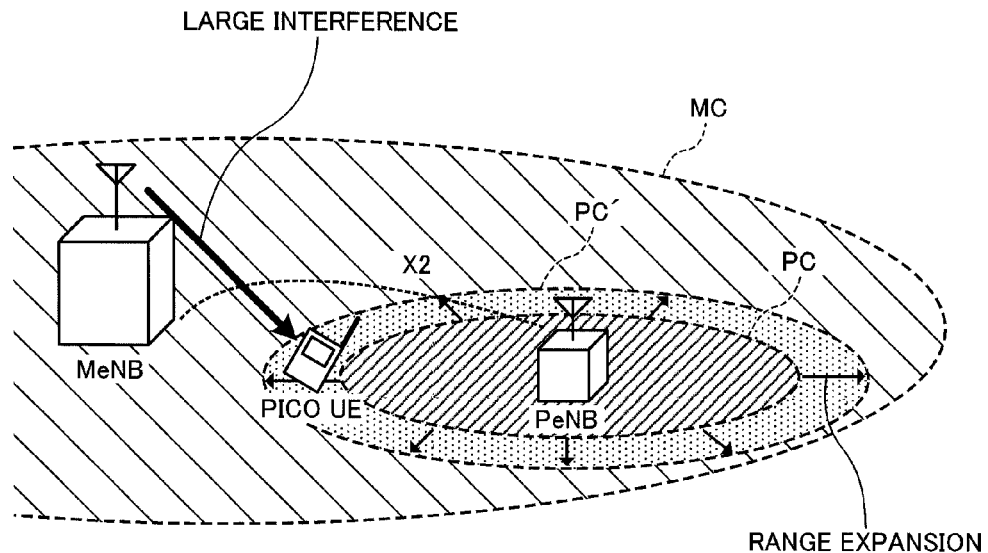
FIG. 2 is a diagram schematically illustrating the configuration of a radio communication system to which HetNet is applied.

In the LTE-A system, HetNet has been under study in which a micro cell (for example, pico cell, femto cell or the like) having a local coverage area of several-ten-meter radius is formed in a macro cell having a wide coverage area of several-kilometer radius. FIG. 2 is a diagram schematically illustrating a configuration of a radio communication system to which HetNet is applied. Note that in FIG. 2, a pico cell is illustrated as an example of the micro cell formed in the macro cell.

The radio communication system illustrated in FIG. 2 includes a macro base station MeNB (Macro evolved NodeB) forming a macro cell MC and a pico base station PeNB (Pico evolved NodeB) forming a pico cell PC and a user terminal UE (User Equipment).

As illustrated in FIG. 2, the macro base station MeNB and the pico base station PeNB are connected to each other via a wired X2 interface. And, the macro base station MeNB and the pico base station PeNB are connected to a core network (not shown). The macro base station MeNB and the pico base station PeNB use at least a part of the radio frequency band on a shared basis.

In the radio communication system illustrated in FIG. 2, when the user terminal UE is placed in the pico cell PC, the reception power from the pico base station PeNB becomes larger than the reception power from the macro base station MeNB and the user terminal UE is connected to the pico base station PeNB. In contrast, when the user terminal UE is placed outside the pico cell PC, the reception power from the macro base station MeNB becomes larger than the reception power from the pico base station PeNB and the user terminal UE is connected to the macro base station MeNB.

In the radio communication system illustrated in FIG. 2, CRE (Cell Range Expansion) is performed. In CRE, an offset is added to the reception power from the pico base station PeNB. When the user terminal UE is placed outside the pico cell PC, but in the expanded pico cell PC', the reception power from the pico base station PeNB (added with the offset) becomes larger than the reception power from the macro base station MeNB. Thus, when the user terminal is placed in the expanded pico cell PC' even outside the pico cell PC, the user terminal UE can be connected to the pico base station PeNB and can be handed over from the macro base station MeNB to the pico base station PeNB. In the following description, the user terminal UE connected to the pico base station PeNB is called "pico UE" and the user terminal UE connected to the macro base station MeNB is called "macro UE", but they are the same in configuration.

When it is handed over from the macro base station MeNB to the pico base station PeNB, the macro UE needs to measure quality of the macro base station MeNB and quality of the pico base station PeNB. However, when the macro UE is positioned as illustrated in FIG. 2, signals from the macro base station MeNB become large interference and there may occur such a situation that the quality of the pico base station PeNB cannot be measured.

Figure 3:
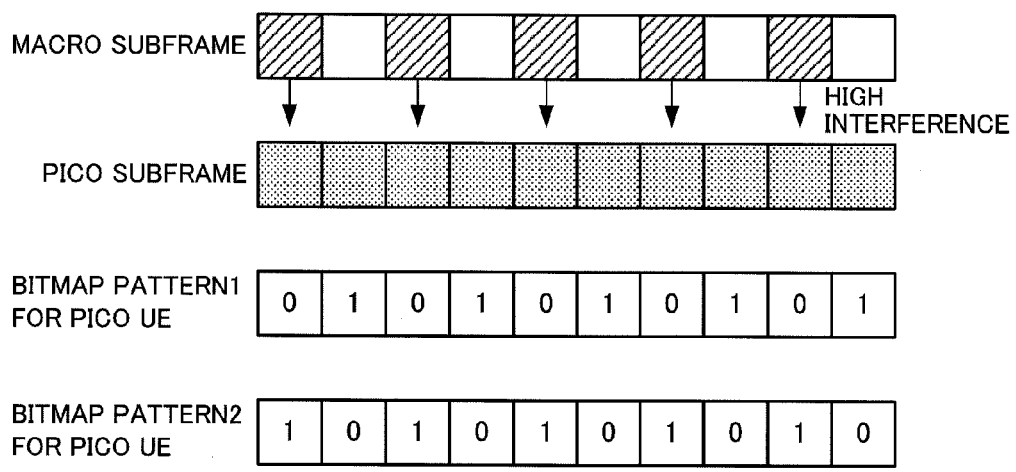
FIG. 3 is a diagram illustrating a subframe pattern when interference coordination is applied.

In order to address this situation, in HetNet, interference coordination has been studied such that the macro base station MeNB stops data transmission in some subframes thereby to reduce interference that the user terminal UE suffers from the macro base station MeNB. FIG. 3 is a diagram illustrating a subframe pattern when interference coordination is applied. In the interference coordination, as illustrated in FIG. 3, some of subframes in the macro base station MeNB are set to transmission stopped subframes. In the example illustrated in FIG. 3, even-numbered subframes from the left are transmission stopped subframes.

Note that the transmission stopped subframes used here include, for example, ABSs and MBSFN subframes. An ABS is a subframe in which CRS (Common Reference Signal) is only transmitted in a data channel and no data is transmitted. An MBSFN subframe is a subframe in which neither data nor CRS is transmitted in a data channel. As no CRS is transmitted in a data channel, the MBSFN subframe has an advantage in reduction of interference due to CRS, as compared with the ABS subframe. In the MBSFN subframe, a CRS is transmitted in a control channel.

In the subframe pattern illustrated in FIG. 3, the pico UE positioned in the pico cell PC' suffers larger interference in odd-numbered subframes and lower interference in even-numbered subframes. When such interference coordination is conducted, it is preferable that CSI (channel state information) in the even-numbered subframes of low interference and CSI in odd-numbered subframes of large interference are fed back from the pico UE to the pico base station PeNB.

In order to realize this CSI feedback, it is considered that a subframe to measure CSI is reported by a higher control signal using higher layer signaling (for example, RRC signaling) from the pico base station. For example, the subframe to measure CSI is designated by bitmap information included in a higher control signal. In this bitmap information, for example, a subframe as a measurement target is designated by "1" and a subframe not as a measurement target is designated by "0".

In FIG. 3, the bitmap pattern 1 is shown as bitmap information indicating CSI in even-numbered subframes of low interference as measurement targets. And, the bitmap pattern 2 is shown as bitmap information indicating CSI in odd-numbered subframes of high interference as measurement targets. As the subframes as CSI measurement targets are thus designated by bitmap information included in a higher control signal, it is possible to feed back both of CSI of even-numbered subframes of low interference and CSI of odd-numbered subframes of high interference to the pico base station PeNB. In the pico base station PeNB, it is possible to select a transmission rate suitable for subframes to transmit data, on the basis of these CSI pieces.

When a user terminal UE performs radio communication using a plurality of component carriers (CCs) in such a HetNet environment, if an aperiodic channel state information reporting is performed, it is necessary to consider a downlink serving cell (downlink CC) required at the network side out of the plural serving cells and also consider interference coordination performed in HetNet.

In this case, as the A-CSI trigger field contained in the UL grant is formed with 2 bits, it is impossible to designate, in addition to a CC as a CSI measurement target, a subframe as a measurement target. Then, the A-CSI trigger field is considered to be increased in number of bits. However, this increase in bit causes an increase in amount of PDCCH information and is not preferable in view of overhead with PDSCH. The present inventors have noted that when a user terminal UE performs radio communication using a plurality of CCs in a HetNet environment and aperiodic channel state information is reported, not only a downlink CC required for the network side but also interference coordination performed in HetNet need to be considered and finally completed the present invention.

The gist of the present invention is that a radio base station apparatus transmits in advance, to a user terminal, channel state measurement target information defining information about presence and absence of CSI reporting and a subframe as a measurement target as being associated with trigger bit information indicating information about presence and absence of CSI reporting and a CC as a measurement target, and the user terminal reports, on a PUSCH to the radio base station apparatus, channel state information of the subframe and the CC designated by the trigger bit information transmitted on a PDCCH. According to the present invention, as the channel state measurement target information including the trigger bit information associated with the information about the subframe and the information about the CC as a CSI measurement target is transmitted in advance to the user terminal, it is possible to specify a CC and a subframe as a CSI measurement target at the user terminal only by transmitting the trigger bit information from the radio base station apparatus. Accordingly, even when the user terminal performs radio communication using a plurality of CCs in a HetNet environment, it is possible to specify a subframe and a CC required at the network side and to report aperiodic channel state information (A-CSI) flexibly.

Figure 4:
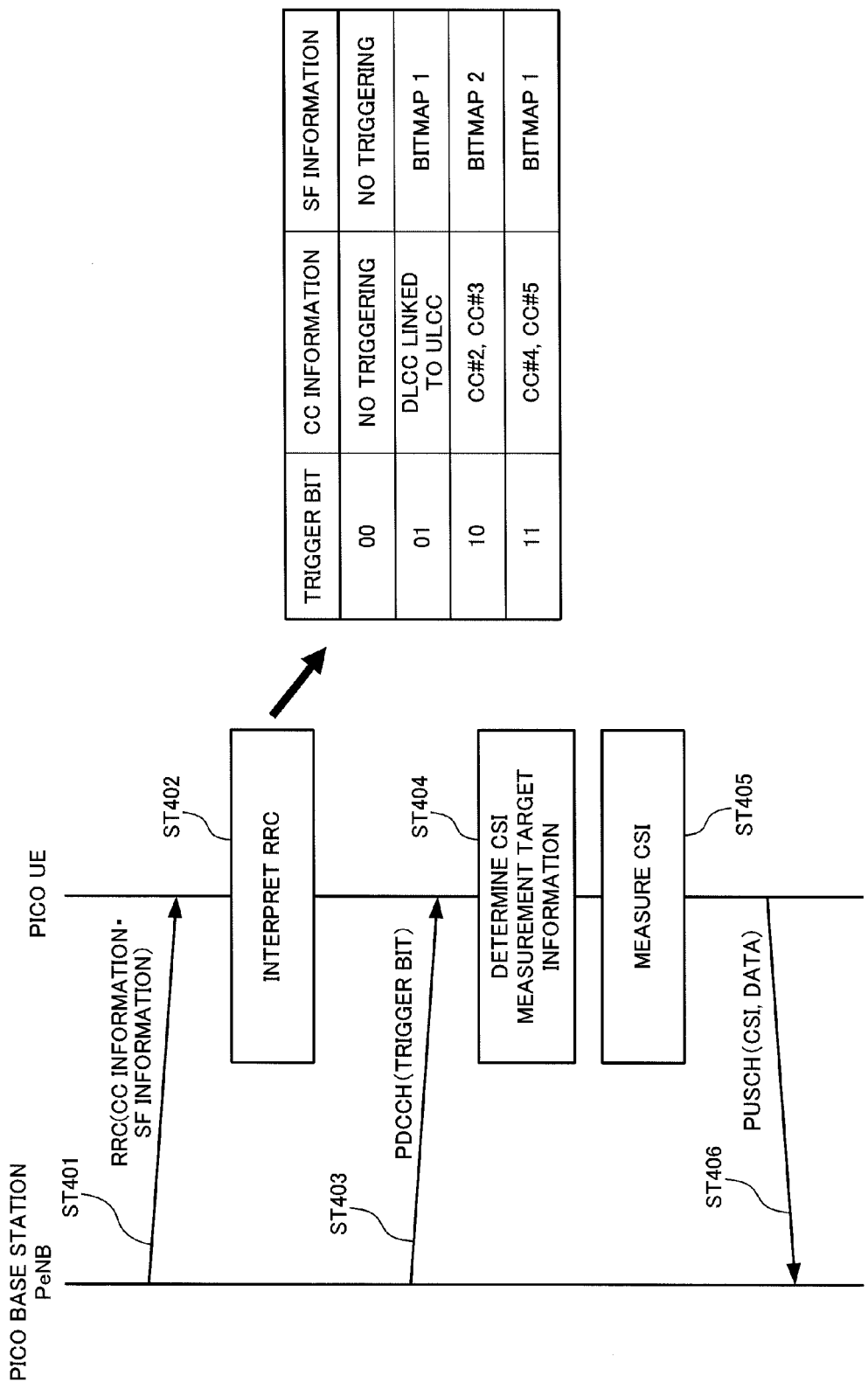
FIG. 4 is a sequence diagram schematically illustrating an aperiodic channel state information reporting method according to an embodiment.

FIG. 4 is a sequence diagram schematically illustrating an aperiodic channel state information reporting method according to the present embodiment. The sequence illustrated in FIG. 4 shows processing between the pico base station PeNB and the pico UE illustrated in FIG. 2. Note that in FIG. 4, radio communication between the pico base station PeNB and the pico UE is conducted using a plurality of CCs. In FIG. 4, interference coordination is performed between the macro base station MeNB and the pico base station PeNB.

Prior to the processing illustrated in FIG. 4, the pico base station PeNB is notified of the information (interference coordination information) including transmission stopped subframes to stop data transmission from the macro base station MeNB via the X2 interface. As illustrated in FIG. 3, the interference coordination information indicating that the even-numbered subframes from the left are transmission stopped subframes is reported. In this case, for example, the interference coordination information reported to the pico base station PeNB is bitmap information (bitmap pattern) indicating that a transmission stopped subframe is "1" and a subframe to transmit data normally is "0".

When receiving interference coordination information, the pico base station PeNB generates a higher control signal including CSI measurement target information indicating a CSI measurement target. This CSI measurement target information is such that 2-bit trigger bit information indicating information about presence and absence of CSI reporting and a CC as a measurement target is associated with information about presence and absence of CSI reporting and a subframe as a measurement target. Note that the information (hereinafter referred to as "CC information") about presence and absence of CSI reporting and a CC as a measurement target and the trigger bit information are common with CSI measurement target information defined in the A-CSI transmitting method illustrated in FIG. 1. That is, the pico base station PeNB generates a higher control signal including CSI measurement target information having information (hereinafter referred to as "SF information") about presence and absence of CSI reporting and a subframe as a CSI measurement target added to the content defined in the A-CSI transmitting method illustrated in FIG. 1.

Here, description is made about SF information as a CSI measurement target. The SF information as a CSI measurement target is, for example, formed of bitmap information. In this bitmap information, for example, a subframe as a measurement target is indicated by "1" and a subframe not as a measurement target is indicated by "0". For example, the bitmap information includes the bitmap pattern 1 defining CSI in even-numbered subframes of low interference as measurement targets and the bitmap pattern 2 defining CSI in odd-numbered subframes of high interference as measurement targets (see FIG. 3). Note that the bitmap pattern is by no means limited to them. It may be modified as appropriate in accordance with interference coordination information reported from the macro base station MeNB.

When generating a higher control signal, the pico base station PeNB reports the higher control signal to the pico UE using higher layer signaling (here, RRC signaling) as illustrated in FIG. 4 (step ST401). When receiving this higher control signal, the pico UE interprets the content of RRC signaling contained in the higher control signal (step ST402). In this case, the interpreted content of RRC signaling (that is, CSI measurement target information) is stored in the pico UE.

In this case, in the pico UE, for example, the CSI measurement target information is stored as illustrated in FIG. 4. For example, when 2-bit trigger bits (value of the A-CSI trigger field) are "00", it is defined that no A-CSI reporting is triggered. When the trigger bits are "01", it is defined that A-CSI-reporting is triggered for the bitmap pattern 1 in DLCC linked to ULCC associated with the UL grant. When the trigger bits are "10", it is defined that A-CSI reporting is triggered for the bitmap pattern 2 in the first CC set (here, CC#2 and CC#3) reported in advance by higher layer signaling. When the trigger bits are "11", it is defined that A-CSI reporting is triggered for the bitmap pattern 1 in the second CC set (here, CC#4 and CC#5) reported in advance by higher layer signaling.

When data transmission is started from the pico base station PeNB to the pico UE while the CSI measurement target information is thus stored, a PDCCH including a UL grant with 2-bit trigger bits designated is transmitted to the pico UE (step ST403). When receiving this PDCCH, the pico UE determines CSI measurement target information based on the 2-bit trigger bits contained in this PDCCH (step ST404). For example, when the trigger bits are "01", it is determined that the CC as a CSI measurement target is DLCC linked to ULCC associated with the UL grant and the subframe as a CSI measurement target is given based on the bitmap pattern 1 (that is, even-numbered subframes from the left illustrated in FIG. 3).

After determining the CSI measurement target information, the pico UE measures CSI of the subframe designated by the bitmap pattern in the determined CC (step ST405). Note that CSI measurement includes, for example, CQI measurement and determination of PMI and RI. The pico UE transmits measured CSI to the pico base station PeNB, together with data of PUSCH assigned by the UL grant (step ST406).

As described up to this point, in the aperiodic channel state information reporting method according to the present embodiment, channel state measurement target information with SF information as a measurement target and presence or absence of CSI reporting associated with trigger bit information indicating CC information as a measurement target and presence or absence of CSI reporting is reported in advance from a pico base station PeNB to a pico UE, and channel state information of the CC and subframe designated by the trigger bit information transmitted on the PDCCH is reported to the pico base station PeNB on a PUSCH. According to this method, as the channel state measurement target information including trigger bit information with SF information associated with CC information as a CSI measurement target is transmitted in advance to the pico UE, the CC and subframe as a CSI measurement target can be specified at the pico UE only by the pico base station PeNB transmitting the trigger bit information. Thus, even when the pico UE performs radio communication using a plurality of CCs in a HetNet environment, it is possible to specify the CC and subframe required at the network side and report aperiodic channel state information (A-CSI) flexibly.

Specifically, in the aperiodic channel state information reporting method according to the present embodiment, in the channel state information, SF information as a measurement target and presence or absence of CSI reporting are associated with the trigger bit information indicating CC information as a measurement target and presence and absence of CSI reporting. Hence, in radio communication using a plurality of CCs, it is possible to reuse CSI measurement target information used to trigger A-CSI reporting to the user terminal UE (that is, CSI measurement target information defining trigger bit information indicating CC information as a measurement target and presence or absence of CSI reporting). Thus, it is possible to prevent complexity in processing (that is, processing to interpret CSI measurement target information) of the user terminal UE when such CSI measurement target information is transmitted from the radio base station apparatus.

In the aperiodic channel state information reporting method according to the present embodiment, a bitmap pattern is generated as SF information as a CSI measurement target. As the bitmap pattern is transmitted as SF information as CSI measurement target, it is possible to specify a subframe as a CSI measurement target definitely at the pico UE. Specifically, the pico base station PeNB generates a bitmap pattern in accordance with information (interference coordination information) including transmission stopped subframes from the macro base station MeNB. Thus, as the bitmap pattern can be generated in consideration of the interference coordination information from the macro base station MeNB, it is possible for the pico base station PeNB to instruct desired A-CSI reporting to the pico UE appropriately.

In the aperiodic channel state information reporting method according to the present embodiment, the CSI measurement target information is transmitted to the pico UE by higher layer signaling. Thus, it is possible to transmit channel state measurement target information having the SF information as a measurement target and presence or absence of CSI reporting associated with trigger bit information indicating CC information as a measurement target and presence or absence of CSI reporting, reliably to the pico UE, prior to actual data communication.

In the aperiodic channel state information reporting method according to the present embodiment, A-CSI trigger bit information is transmitted in the UL grant of a PDCCH. With this transmission, in radio communication using a plurality of CCs, it is possible to report a CC and a subframe as a CSI measurement target to the pico UE by the common processing with the case of triggering A-CSI reporting to the user terminal UE. Specifically, the trigger bit information is formed with 2 bits. Thus, in radio communication using a plurality of CCs, it is possible to specify SF information as a measurement target and presence or absence of CSI reporting in the CSI measurement target information by the same number of bits as those used in triggering A-CSI reporting to the user terminal UE, thereby preventing any increase in amount of PDCCH information.

Note that this embodiment has been described by way of example where trigger bit information is transmitted in the UL grant of PDCCH. However, this way of transmitting trigger bit information is by no means limiting and may be modified as appropriate. For example, trigger bit information may be transmitted in downlink (DL) assignment of PDCCH.

Figure 5:
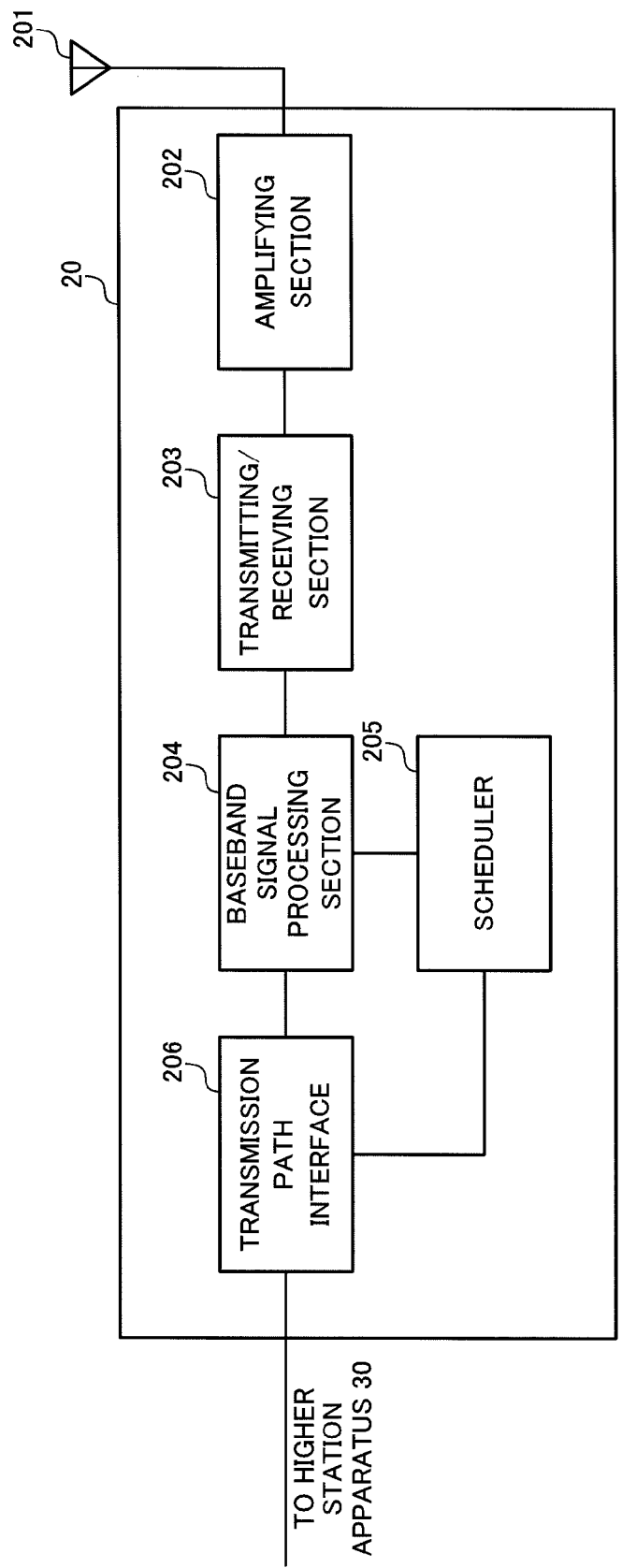
FIG. 5 is a block diagram illustrating an overall configuration of a radio base station apparatus provided in the radio communication system to which the aperiodic channel state information reporting method according to the present embodiment is applied.
Figure 6:
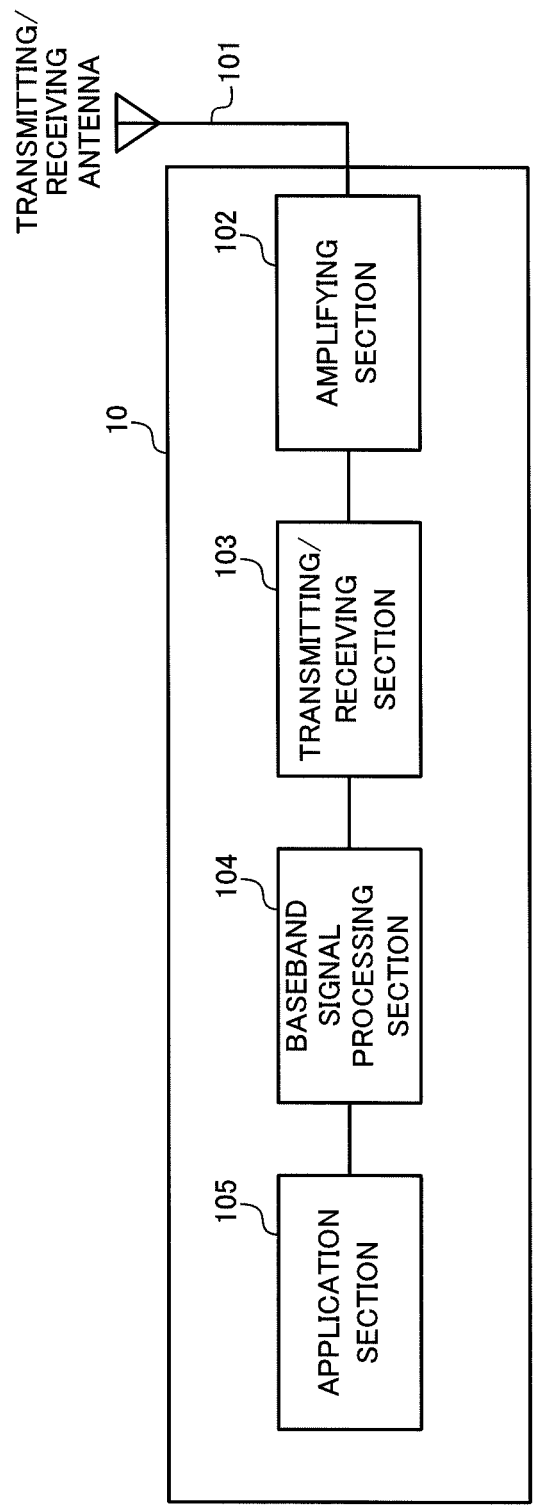
FIG. 6 is a block diagram illustrating an overall configuration of a user terminal provided in the radio communication system to which the aperiodic channel state information reporting method according to the present embodiment is applied.

Next description is made about configurations of a radio base station apparatus 20 (pico base station PeNB) and a user terminal 10 (pico UE) provided in a radio communication system to which the aperiodic channel state information reporting method according to the present embodiment is applied. FIG. 5 is a block diagram illustrating an overall configuration of the radio base station apparatus 20 provided in the radio communication system to which the aperiodic channel state information reporting method according to the present embodiment is applied. FIG. 6 is a block diagram of an overall configuration of the user terminal 10 provided in the radio communication system to which the aperiodic channel state information reporting method according to the present embodiment is applied.

As illustrated in FIG. 5, the radio base station apparatus 20 has a transmitting/receiving antenna 201, an amplifying section 202, a transmitting/receiving section 203, a baseband signal processing section 204, a scheduler 205 and a transmission path interface 206. Transmission data to be transmitted from the radio base station apparatus 20 to the user terminal 10 is input from a higher station apparatus 30 including a macro base station MeNB to the baseband signal processing section 204 via the transmission path interface 206 (X2 interface).

In the baseband signal processing section 204, PDCP layer processing, division and coupling of transmission data, RLC (Radio Link Control) layer transmission processing such as RLC retransmission control transmission processing, MAC (Medium Access Control) retransmission control, including, for example, HARQ transmission processing, scheduling, transport format selection, channel coding, inverse fast Fourier transform (IFFT) processing, precoding processing, and the like are performed. As with signals of the physical downlink control channel, which is a downlink control channel, transmission processing such as channel coding and inverse fast Fourier transform is performed.

The baseband signal processing section 204 notifies each user terminal 10 connected to the same cell of control information for allowing the user terminal 10 to perform radio communication with the radio base station apparatus 20, by a broadcast channel. Broadcast information for radio communication includes, for example, the uplink or downlink system bandwidth, identification information of a root sequence (root sequence index) for generating random access preamble signals in the PRACH (Physical Random Access CHannel), and so on.

The transmitting/receiving section 203 converts the baseband signal output from the baseband signal processing section 204, into a radio frequency band frequency-domain signal. The amplifying section 202 amplifies the transmission signal having been converted to the frequency-domain signal, and outputs the result to the transmitting/receiving antenna 201. Note that the transmitting/receiving section 203 serves as a transmitting section for transmitting channel state measurement target information to the user terminal 10 and also as a receiving section for receiving channel state information of a CC and a subframe transmitted from the user terminal.

Meanwhile, as for signals to be transmitted on the uplink from the user terminal 10 to the radio base station apparatus 20, a radio frequency signal that is received by the transmitting/receiving antenna 201 is amplified in the amplifying section 202. The signal is subjected to frequency conversion and converted into a baseband signal in the transmitting/receiving section 203, and is input to the baseband signal processing section 204.

The baseband signal processing section 204 performs FFT processing, IDFT processing, error correction decoding, MAC retransmission control reception processing, and RLC layer and PDCP layer reception processing on the transmission data included in the baseband signal that is received on the uplink. The decoded signal is transferred to the higher station apparatus 30 through the transmission path interface 206. Note that the radio base station apparatus 20 has a call processing section as a functional element related to voice call. The call processing section performs call processing such as setting up and releasing a communication channel, manages the state of the radio base station apparatus 20 and manages the radio resources.

Figure 7:
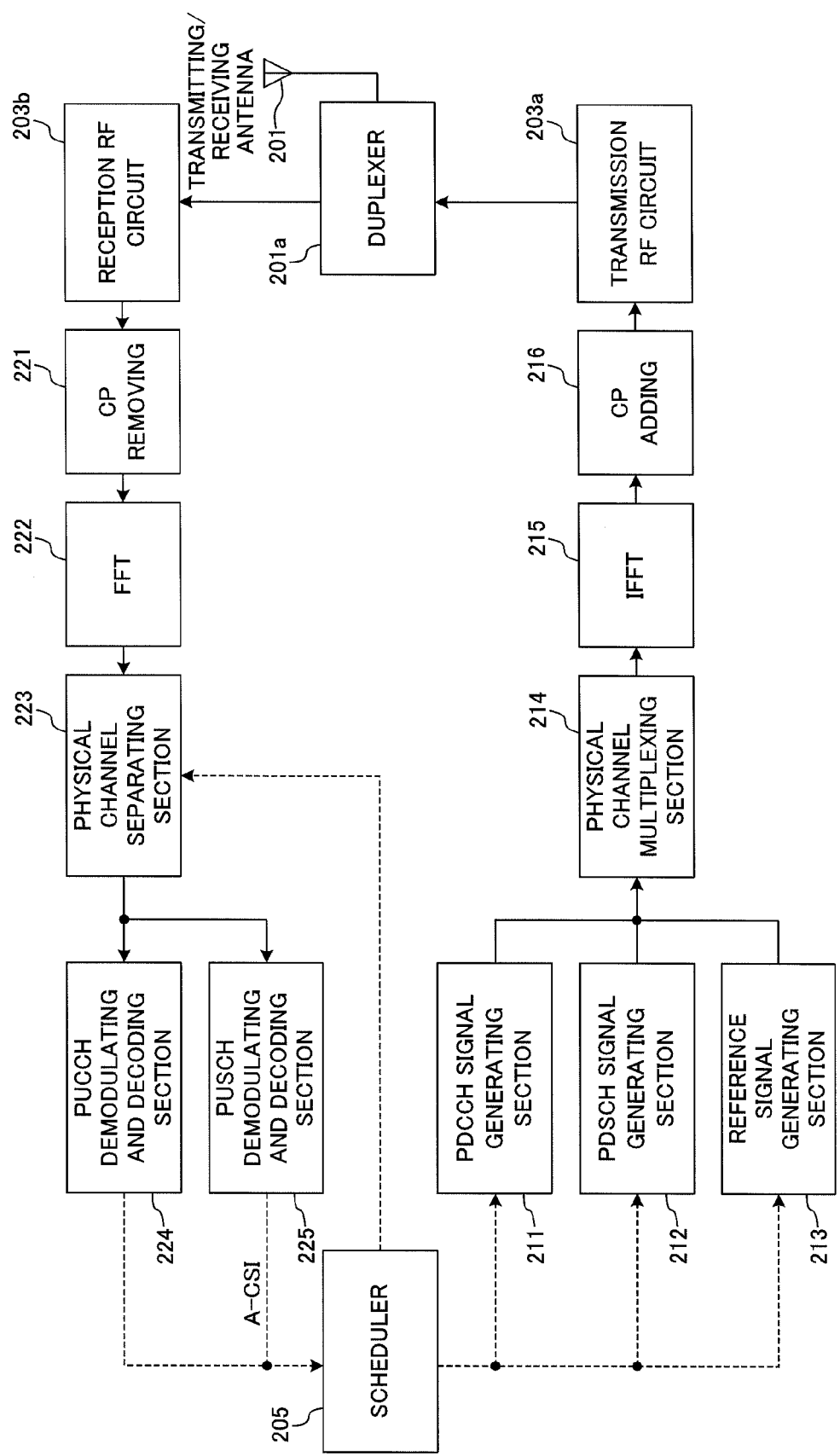
FIG. 7 is a block diagram illustrating a detailed configuration of a baseband signal processing section and a scheduler provided in the radio base station apparatus according to the present embodiment.

Next, referring to FIG. 7, description is made about the detailed configurations of the scheduler 205 and the baseband signal processing section 204 of the radio base station apparatus 20. FIG. 7 is a block diagram illustrating the detailed configurations of the scheduler 205 and the baseband signal processing section 204 provided in the radio base station apparatus 20 according to the present embodiment.

The scheduler 205 determines allocation of component carriers (CCs) to the served user terminal in accordance with communication quality of a system band, and adds/deletes CCs to be allocated to communication with the user terminal 10. The transmission path in a mobile communication fluctuates differently per frequency due to frequency selective fading. The scheduler 205 recognize a channel state from channel state information (CSI) measured at the user terminal 10 based on a downlink reference signal (CRS, CSI-RS etc.) and performs scheduling in accordance with the channel state.

Specifically, the scheduler 205 performs adaptive frequency scheduling to allocate a resource block of good communication quality per subframe to the user terminal 10. In the adaptive frequency scheduling, a user terminal 10 of good transmission path quality for each resource block is selected and allocated. The scheduler 205 uses the CQI per resource block fed back from the user terminal 10 as a basis to allocate a resource block with the expectation of improvement in throughput. And, an MCS (coding rate and modulation scheme) is determined to meet a predetermined block error rate in the allocated resource block. Parameters to satisfy the MCS (coding rate and modulation scheme) determined by the scheduler 205 are set to a PDCCH signal generating section 211, a PDSCH signal generating section 212, a reference signal generating section 213 and so on.

The PDCCH signal generating section 211 generates a downlink signal including a UL grant for PUSCH demodulation and a downlink allocation signal for PDSCH demodulation. In the LTE/LTE-A system, the downlink allocation signal for PDSCH demodulation is defined as DCI formats 1, 1A, 1B, 1C, 2, 2A, 2B. And, the UL grant for PUSCH demodulation is defined as DCI format 0/4. In this embodiment, the PDCCH signal generating section 211 generates downlink control information (DCI) including the UL grant for designating 2-bit trigger bit information defined in the CSI measurement target information.

The PDSCH signal generating section 212 constitutes a generating section to generate channel state measurement target information, and generates a data channel signal including a higher control signal and transmission data input from the higher station apparatus 30 (macro base station MeNB) via the transmission path interface 206.

The PDSCH signal generating section 212 generates a higher control signal including the above-described CSI measurement target information. Specifically, the PDSCH signal generating section 212 generates the higher control signal includes CSI information as a measurement target and presence or absence of CSI reporting associated with trigger bit information indicating CC information as a measurement target and presence or absence of CSI reporting. When generating SF information included in the CSI measurement target information, the PDSCH signal generating section 212 generates bitmap (bitmap pattern) based on the interference coordination information transmitted from the macro base station MeNB via the scheduler 205. Note that the generated higher control information is transmitted to the user terminal 10 by higher layer signaling (for example, RRC signaling).

The reference signal generating section 213 generates a downlink reference signal. In the LTE/LTE-A system, a CRS (Cell-specific Reference Signal), a DM-RS (Demodulation-Reference Signal) and a CSI-RS are defined as downlink reference signals. The CSI-RS is a reference signal only used to measure channel state information (CQI, PMI, RI), which signal is multiplexed in the shared data channel (PDSCH).

A physical channel multiplexing section 214 maps the downlink control channel signal generated by the PDCCH signal generating section 211, the downlink data channel signal generated by the PDSCH signal generating section 212 and the downlink reference signal generated by the reference signal generating section 213 to radio resources and multiplexes them to the physical channel.

The downlink signal multiplexed in the physical channel multiplexing section 214 is converted into a time-domain signal in an IFFT (Inverse Fast Fourier Transform) section 215. Then, the downlink signal is added with cyclic prefixes (CPs) in a CP adding section 216 and transmitted from the transmitting/receiving antenna 201 through a transmission RF circuit 203*a* (equivalent to the transmitting/receiving section 203 and amplifying section 202 in FIG. 5) and a duplexer 201*a*. Note that the cyclic prefix serves as a guard interval to absorb difference in multipath propagation delay.

In the meantime, the radio base station apparatus 20 receives, by the transmitting/receiving antenna 201, an uplink signal transmitted by the user terminal 10. The received uplink signal is frequency-converted to a baseband signal at a reception RF circuit 203*b* (equivalent to the transmitting/receiving section 203 and amplifying section 202 in FIG. 5). The frequency-converted uplink signal is subjected to removal of the cyclic prefixes at a CP removing section 221. And, the signal is subjected to Fourier transform and converted into a frequency-domain signal at an FFT (fast Fourier transform) section 222, and then input to a physical channel separating section 223.

The physical channel separating section 223 uses uplink resource allocation information, which is given from the scheduler 205, as a basis to separate the received uplink signal. In the example illustrated in FIG. 7, the physical channel separating section 223 separates the received uplink signal into a PUCCH signal and a PUSCH signal.

A PUCCH demodulating and decoding section 224 demodulates and decodes the uplink control channel (PUCCH). By decoding the PUCCH, transmission acknowledgement for PDSCH (ACK/NACK), scheduling request and periodic CSI are obtained. These information pieces are output to the scheduler 205.

A PUSCH demodulating and decoding section 225 demodulates and decodes the uplink shared data channel (PUSCH). In this embodiment, the PUSCH demodulating and decoding section 225 demodulates and decodes A-CSI triggered by trigger bit information contained in the UL grant and demodulates and decodes the uplink user data (PUSCH). These information pieces are output to the scheduler 205.

In this way, in the radio base station apparatus according to the present embodiment, a higher control signal including CSI measurement target information is generated by the PDSCH generating section 212 prior to actual data communication and transmitted to the pico UE by higher layer signaling. With this structure, it is possible to, prior to accrual data transmission, transmit the channel state measurement target information having SF information as a measurement target and presence or absence of CSI reporting associated with trigger bit information indicating CC information as a measurement target and presence or absence of CSI reporting, reliably to the pico UE.

When starting actual data transmission, the PDCCH including the UL grant designating the trigger bit information is generated by the PDCCH signal generating section 211 and transmitted on the downlink to the pico UE. With this structure, it is possible to report, to the pico UE, a CC and a subframe as a CSI measurement target by the common processing to the case where A-CSI reporting is triggered to the user terminal UE in radio communication using a plurality of CCs. Particularly, the trigger bit information is formed of 2 bits. Thus, it is possible to specify SF information as a measurement target and presence or absence of CSI reporting in the CSI measurement target information with use of the same number of bits as the case where A-CSI reporting is triggered to the user terminal in radio communication using a plurality of CCs, thereby preventing any increase in amount of PDCCH information.

Next description is made about an overall configuration of the user terminal 10 provided in the radio communication system to which the aperiodic channel state information reporting method according in FIG. 6, the user terminal 10 has a transmitting/receiving antenna 101, an amplifying section 102, a transmitting/receiving section 103, a baseband signal processing section 104 and an application section 105.

The amplifying section 102 amplifies a radio frequency signal received by the transmitting/receiving antenna 101 and outputs the result to the transmitting/receiving section 103. The transmitting/receiving section 103 performs frequency conversion to convert the radio frequency signal into a baseband signal and outputs the result to the baseband signal processing section 104.

The baseband signal processing section 104 performs reception processing such as FFT processing, error correction decoding and retransmission control and so on. In this downlink data, downlink transmission data (user data) is transferred to the application section 105. The application section 105 performs processing related to higher layers above the physical layer and the MAC layer. Also, in the downlink data, broadcast information is also transferred to the application section 105.

Uplink transmission data (user data) is input from the application section 105 to the baseband signal processing section 104. In the baseband signal processing section 104, retransmission control (H-ARQ (Hybrid ARQ)) transmission processing, channel coding, DFT processing, and IFFT processing are performed. The baseband signal output from the baseband signal processing section 104 is converted into a radio frequency band in the transmitting/receiving section 103. After that, the signal is amplified in the amplifying section 102 and transmitted from the transmitting/receiving antenna 101. Note that the transmitting/receiving section 103 serves as a receiving section for receiving channel state measurement target information from the radio base station apparatus 20 and a transmitting section for transmitting measured CSI to the radio base station apparatus 20.

Figure 8:
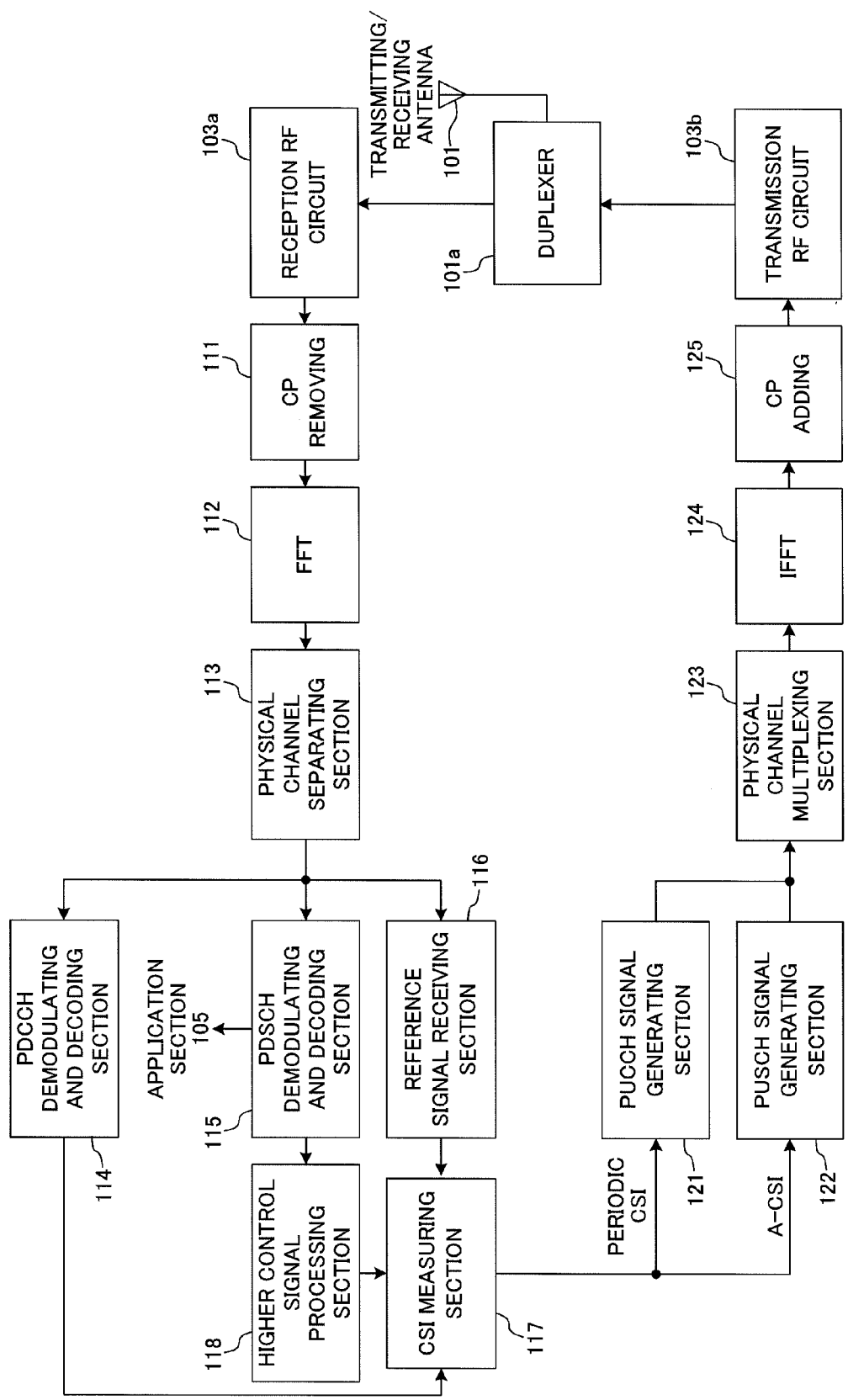
FIG. 8 is a block diagram illustrating a detailed configuration of a baseband signal processing section provided in the user terminal according to the present embodiment.

Here, with reference to FIG. 8, description is made about a detailed configuration of the baseband signal processing section 104 of the user terminal 10. FIG. 8 is a block diagram illustrating the detailed configuration of the baseband signal processing section 104 provided in the user terminal according to the present embodiment. A downlink signal transmitted from the radio base station apparatus 20 is received by the transmitting/receiving antenna 101. The received downlink signal is converted to a baseband signal in a reception RF circuit 103a (equivalent to the transmitting/receiving section 103 and the amplifying section 102 in FIG. 6).

A CP removing section 111 removes cyclic prefixes (CPs) from the baseband signal and outputs the result to an FFT (Fast Fourier Transform) section 112. The FFT section 112 performs Fourier transform on the CP-removed received downlink signal, converts it to the frequency-domain signal and outputs the result to a physical channel separating section 113.

The physical channel separating section 113 separates a PDCCH, a PDSCH, a reference signal (CRS, DM-RS, CSI-RS) and so on multiplexed to the received downlink signal. The separated physical downlink control channel signal (PDCCH) is output to a PDCCH demodulating and decoding section 114. The separate physical downlink shared data channel signal (PDSCH) is output to a PDSCH demodulating and decoding section 115. The separated downlink reference signal (CRS, DM-RS, CSI-RS and so on) is output to a reference signal receiving section 116.

The PDCCH demodulating and decoding section 114 demodulates and decodes the physical downlink control channel signal (PDCCH). The physical downlink control channel signal includes downlink control information (downlink allocation signal or UL grant). When A-CSI reporting is triggered by the UL grant, the PDCCH demodulating and decoding section 114 outputs the trigger bit information contained in the UL grant to a CSI measuring section 117.

The PDSCH demodulating and decoding section 115 demodulates and decodes the downlink shared data channel signal (PDSCH). The decoded downlink shared data is transferred to the application section 105. When the downlink shared data channel signal (PDSCH) contains a higher control signal defining the CSI measurement target information, this higher control signal is transmitted to a higher control signal processing section 118. The higher control signal processing section 118 interprets the CSI measurement target information defined in this higher control signal and stores it in the CSI measuring section 117.

In the reference signal separated by the physical channel separating section 113, a CSI-RS is output from the reference signal receiving section 116 to the CSI measuring section 117.

The CSI measuring section 117 measures CSI based on the CSI-RS received as input from the reference signal receiving section 116. Specifically, the CSI measuring section 117 measures CQI and determines PMI and RI. When receiving the trigger bit information contained in the UL grant from the PDCCH demodulating and decoding section 114, the CSI measuring section 117 determines a CC and a subframe as a CSI measurement target indicated by the trigger bit information and measures A-CSI based on the CSI-RS in these CC and subframe. That is, the CSI measuring section 117 serves as a measuring section for measuring CSI of the CC and subframe designated by the trigger bit information. The measured A-CSI is transferred to a PUSCH signal generating section 122.

Note that the CSI measuring section 117 has a function of measuring CSI (hereinafter referred to as "periodic CSI") based on the CSI-RS transmitted periodically from the radio base station apparatus 20, however, for convenience of explanation, detailed explanation of this function is omitted here. The measured periodic CSI is transmitted to a PUCCH signal generating section 121.

The PUCCH signal generating section 121 generates an uplink control channel signal such as ACK/NACK, periodic CSI or the like transmitted on the PUCCH and transmits the signal to a physical channel multiplexing section 123. The PUSCH signal generating section 122 generates an uplink data channel signal of higher control information and transmission data from the application section 105 and transmits the signal to the physical channel multiplexing section 123. And, when A-CSI reporting is triggered by the UL grant, the PUSCH signal generating section 122 generates an uplink data channel signal containing A-CSI received as input from the CSI measuring section 117, and transmits the signal to the physical channel multiplexing section 123.

The physical channel multiplexing section 123 performs channel multiplexing on the physical channel signals sent from the PUCCH signal generating section 121 and the PUSCH signal generating section 122. The uplink signal channel-multiplexed by the physical channel multiplexing section 123 is converted to a time-domain signal at an IFFT (Inverse Fast Fourier Transform) section 124, added with cyclic prefixes in a CP adding section 125 and transmitted by the transmitting/receiving antenna 101 through a transmission RF circuit 103b (equivalent to the transmitting/receiving section 103 and the amplifying section 102 in FIG. 6) and a duplexer 101a.

As described above, in the user terminal 10 according to the present embodiment, when a higher control signal defining CSI measurement target information is contained in the downlink shared data channel signal (PDSCH), the higher control signal processing section 118 interprets the CSI measurement target information and stores the result in the CSI measuring section 117. Then, receiving the UL grant including the trigger bit information, the PDCCH demodulating and decoding section 114 outputs the trigger bit information to the CSI measuring section 117. The CSI measuring section 117 uses the stored CSI measurement target information as a basis to determine a CC and a subframe as a CSI measurement target indicated by the trigger bit information received as input from the PDCCH demodulating and decoding section 114, and measures A-CSI based on the CSI-RS in these CC and subframe. The measured A-CSI is transmitted to the radio base station apparatus 20 as a part of PUSCH transmitted from the PUSCH signal generating section 122. Accordingly, it is possible to report A-CSI of the CC and subframe designated by the trigger bit information from the radio base station apparatus 20 flexibly.

As has been described up to this point, in the aperiodic channel state information reporting method according to the present embodiment, channel state measurement target information having SF information as a measurement target and presence or absence of CSI reporting associated with trigger bit information indicating CC information as a measurement target and presence or absence of CSI reporting is reported in advance from the pico base station PeNB to the pico UE, and channel state information of CC and subframe designated by the trigger bit information transmitted on the PDCCH is reported to the pico base station PeNB on a PUSCH. With this method, as the channel state measurement target information including trigger bit information associated with the SF information and CC information as a CSI measurement target is transmitted in advance to the pico UE, it is possible to specify the CC and subframe as a CSI measurement target at the pico UE only by transmitting the trigger bit information from the pico base station PeNB. Thus, even when the pico UE performs radio communication using a plurality of CCs in a HetNet environment, it is possible to specify CC and subframe required at the network side and report aperiodic channel state information (A-CSI) flexibly.

When the CSI measurement target information is transmitted in a higher control signal from the radio base station apparatus 20 to the user terminal 10, the higher control signal may be a single higher control signal. That is, channel state measurement target information having SF information as a measurement target and presence or absence of CSI reporting associated with trigger bit information indicating CC information as a measurement target and presence or absence of CSI reporting is transmitted to the user terminal 10 by batch processing. However, the aspect of transmitting the CSI measurement target information in a higher control signal is by no means limiting and may be modified as appropriate. For example, such a configuration may be adopted that, first, trigger bit information indicating CC information as a measurement target and presence or absence of CSI reporting is transmitted to the user terminal 10, and SF information as a measurement target and presence or absence of CSI reporting associated with the trigger bit information is then transmitted to the user terminal 10. That is, the trigger bit information indicating CC information as a measurement target and presence or absence of CSI reporting and SF information as a measurement target and presence or absence of CSI reporting may be transmitted at different timings.

The present invention has been described in detail up to this point. However, a person of ordinary skill in the art would understand that the present invention is by no means limited to the embodiment described here. The present invention can be embodied in various modified or altered forms without departing from the sprit or scope of the present invention defined by claims. Accordingly, the description is given only for illustrative purposes and is by no means intended to limit the present invention.

For example, the CSI measurement target information is not limited to that illustrated in FIG. 4 and may be modified as appropriate. For example, as illustrated in FIG. 9A, when the trigger bits are "10" or "11", all the CCs (for example CC#0 to CC#4) may be designated as the first or second CC set reported in advance by higher layer signaling. And as illustrated in FIG. 9B, when the trigger bits are "01", one CC where the user terminal performs communication primarily (PCC: Primary Component Carrier) may by designated as a CC. Further, as illustrated in FIG. 9B, when the trigger bits are "11", a plurality of bitmap patterns (bitmap patterns 1, 2) may be included in the bitmap pattern reported in advance by higher layer signaling.

The disclosure of Japanese Patent Application No. 2011-033685, filed on Feb. 18, 2011, including the specification, drawings, and abstract, is incorporated herein by reference in its entirety.

The invention claimed is:

1. An aperiodic channel state information reporting method comprising the steps of:
   transmitting in advance, from a radio base station apparatus to a user terminal, channel state measurement target information having information about presence or absence of reporting of channel state information and a subframe as a measurement target associated with trigger bit information indicating information about presence or absence of reporting of channel state information and a component carrier as a measurement target; and
   reporting channel state information of the subframe and the component carrier designated by the trigger bit information transmitted on a downlink control channel, to the radio base station apparatus on an uplink shared channel,
   wherein the radio base station apparatus generates a bitmap pattern as the information about the subframe as the measurement target of the channel state information,
   wherein in a heterogeneous network having a network configuration where a macro cell and a micro cell smaller than the macro cell overlay each other, the radio base station apparatus is a micro base station apparatus provided in the micro cell and transmits the channel state measurement target information in advance to the user terminal located in the micro cell, and
   wherein the radio base station apparatus generates the bitmap pattern in accordance with information including transmission stopped subframes from a macro base station apparatus provided in the macro cell.

2. The aperiodic channel state information reporting method of claim 1, wherein the radio base station apparatus transmits the channel state measurement target information to the user terminal with use of a higher control signal using higher layer signaling.

3. The aperiodic channel state information reporting method of claim 2, wherein the radio base station apparatus transmits the trigger bit information indicating the information about the presence or absence of reporting of the channel state information and the component carrier as the measurement target to the user terminal and then, transmits the information about the presence or absence of reporting of the channel state information and the subframe as the measurement target associated with the trigger bit information to the user terminal.

4. The aperiodic channel state information reporting method of claim 2, wherein the radio base station apparatus transmits the channel state measurement target information to the user terminal in a single higher control signal.

5. The aperiodic channel state information reporting method of claim 1, wherein the radio base station apparatus transmits the trigger bit information in an uplink scheduling grant included in the downlink control channel.

6. The aperiodic channel state information reporting method of claim 5, wherein the trigger bit information is formed of 2 bits.

7. A radio base station apparatus comprising:
   a generating section configured to generate channel state measurement target information having information about presence or absence of reporting of channel state information and a subframe as a measurement target associated with trigger bit information indicating information about presence or absence of reporting of channel state information and a component carrier as a measurement target;
   a transmitting section configured to transmit, to a user terminal, the channel state measurement target information generated by the generating section; and
   a receiving section configured to receive channel state information of the subframe and the component carrier transmitted from the user terminal in accordance with the trigger bit information designated in a downlink control channel,
   wherein the generating section generates a bitmap pattern as the information about the subframe as the measurement target of the channel state information,
   wherein in a heterogeneous network having a network configuration where a macro cell and a micro cell smaller than the macro cell overlay each other, the radio base station apparatus is installed in the micro cell, and
   wherein the generating section generates the bitmap pattern in accordance with information including transmission stopped subframes from a macro base station apparatus provided in the macro cell.

8. The radio base station apparatus of claim 7, wherein the transmitting section transmits the channel state measurement target information to the user terminal in a higher control signal using higher layer signaling.

9. The radio base station apparatus of claim 7, wherein the transmitting section transmits the trigger bit information by an uplink scheduling grant contained in the downlink control channel.

10. A user terminal comprising:
    a receiving section configured to receive, from a radio base station apparatus, channel state measurement target information having information about presence or absence of reporting of channel state information and a subframe as a measurement target associated with trigger bit information indicating information about presence or absence of reporting of channel state information and a component carrier as a measurement target;
    a measurement section configured to measure channel state information of the subframe and the component carrier designated by the trigger bit information transmitted on a downlink control channel; and
    a transmitting section configured to transmit the channel state information measured by the measuring section, to the radio base station apparatus on an uplink shared channel,
    wherein the radio base station apparatus generates a bitmap pattern as the information about the subframe as the measurement target of the channel state information,
    wherein in a heterogeneous network having a network configuration where a macro cell and a micro cell smaller than the macro cell overlay each other, the radio base station apparatus is a micro base station apparatus provided in the micro cell and transmits the channel state measurement target information in advance to the user terminal located in the micro cell, and
    wherein the radio base station apparatus generates the bitmap pattern in accordance with information including transmission stopped subframes from a macro base station apparatus provided in the macro cell.

* * * * *